United States Patent [19]

Henson et al.

[11] Patent Number: 5,337,390
[45] Date of Patent: Aug. 9, 1994

[54] ADHESIVELESS CONNECTOR FOR OPTICAL FIBERS

[75] Inventors: Gordon D. Henson, Lake Elmo; Nicholas A. Lee, Woodbury, both of Minn.

[73] Assignee: Minnesota Mining and Manufacturing Company, St. Paul, Minn.

[21] Appl. No.: 109,900

[22] Filed: Aug. 23, 1993

Related U.S. Application Data

[63] Continuation of Ser. No. 871,399, Apr. 21, 1992, abandoned.

[51] Int. Cl.⁵ .............................................. G02B 6/36
[52] U.S. Cl. ............................................ 385/81; 385/84; 385/136
[58] Field of Search ................... 385/78, 81, 83, 84, 385/86, 87, 136, 137, 139

[56] References Cited

U.S. PATENT DOCUMENTS

| | | | |
|---|---|---|---|
| 4,029,390 | 6/1977 | Chinnock et al. | 385/137 X |
| 4,368,948 | 1/1983 | Despouys | 350/96.20 |
| 4,448,481 | 5/1984 | Basov et al. | 385/136 |
| 4,593,972 | 7/1986 | Gibson | 385/70 |
| 4,607,911 | 8/1986 | Rhodes | 385/136 X |
| 4,750,804 | 6/1988 | Osaka et al. | 385/137 X |
| 4,767,177 | 8/1988 | Cartier | 350/96.20 |
| 4,818,055 | 4/1989 | Patterson | 385/98 |
| 4,824,197 | 4/1989 | Patterson | 350/96.21 |
| 4,842,363 | 6/1989 | Margolin et al. | 350/96.21 |
| 4,850,671 | 7/1989 | Finzel | 385/69 |
| 4,877,303 | 10/1989 | Caldwell et al. | 350/96.21 |
| 4,961,624 | 10/1990 | Savitsky et al. | 350/96.20 |
| 4,964,685 | 10/1990 | Savitsky et al. | 350/96.2 |
| 4,964,688 | 10/1990 | Caldwell et al. | 350/96.20 |
| 4,984,865 | 1/1991 | Lee et al. | 385/53 |
| 5,013,123 | 5/1991 | Patterson | 350/96.21 |
| 5,044,719 | 9/1991 | Nakamura | 385/76 |
| 5,088,804 | 2/1992 | Grinderslev | 385/81 |
| 5,102,212 | 4/1992 | Patterson | 385/98 |
| 5,138,681 | 8/1992 | Larson et al. | 385/95 |
| 5,159,653 | 10/1992 | Carpenter et al. | 385/95 |
| 5,159,655 | 10/1992 | Ziebol et al. | 385/81 |
| 5,189,717 | 2/1993 | Larson | 385/95 |

FOREIGN PATENT DOCUMENTS

0063085A2 10/1982 European Pat. Off. ....... G02B 7/26

OTHER PUBLICATIONS

Product literature entitled "AMP Light Crimp ST Style Connector," by AMP Incorporated, Harrisburg, Pa., p. 56, before Apr. 21, 1992.

Product literature entitled "OFTI STC Fiber Optic Connectors," p. 7; and EXT Specifications and XTC Evaluation Kits, p. 7, by Ofti, Westford, Mass., before Apr. 21, 1992.

Product literature entitled "OFTI XTC No-Epoxy Fiber Connectors", by Ofti, Westford, Mass., p. 1, before Apr. 21, 1992.

Product literature entitled "OFTI's No-Epoxy XTC," by Ofti, Westford, Mass., before Apr. 21, 1992.

Product literature entitled "General Connectors for Silica/Silicone Fiber Optics," from Radiall, pp. 5 and 6, before Apr. 21, 1992.

*Primary Examiner*—Frank Gonzalez
*Attorney, Agent, or Firm*—Gary L. Griswold; Walter N. Kirn; Stephen W. Buckingham

[57] ABSTRACT

An adhesiveless optical fiber connector utilizes a mechanical gripping element to hold the fiber in place. The gripping element will receive an optical fiber when it is disengaged and hold the fiber when engaged. It is engageable by moving a plug in a direction transverse to the fiber.

9 Claims, 3 Drawing Sheets

ADHESIVELESS CONNECTOR FOR OPTICAL FIBERS

This is a continuation of Application No. 07/871,399 filed Apr. 21, 1992 now abandoned.

BACKGROUND OF THE INVENTION

Optical fiber connectors commonly use ferrules to insure alignment of the fibers. Typically two fibers that are to be connected are inserted into housings having matching ferrules attached thereto. The ends of the fibers are then polished to produce a smooth optical finish and the ferrules are inserted into a central housing that holds them close together and in precise alignment.

The term "connector" is often used in a variety of ways in the field of fiber optics. Sometimes it is used to refer to two of the housings with ferrules as described above along with the central housing. At other times it is used to refer to a single housing with a ferrule. This later definition will be adopted herein. Thus, in order to connect two optical fibers, two connectors and a central housing are required.

The ferrules used in fiber optic connectors come in many shapes and can be of many of different materials. Typically the ferrules are of a ceramic material, although metallic or plastic materials can also be used. The ferrule may be cylindrical, as in the widely used ST connector defined by proposed EIA Specification 475E000 or in an SC connector, or it may be a truncated cone as in the case of a biconic connector.

In order to insure a good optical connection, as well as the structural integrity of the connector, the fiber must be tightly bound in the connector. Typically this is done by use of an adhesive. Most commonly an epoxy is used to hold a fiber in a connector housing and ferrule. Once an epoxy has hardened, it cannot be loosened. Thus, if a fiber is incorrectly installed in a connector housing and ferrule, or is damaged subsequent to such installation, the housing and ferrule cannot be reused. U.S. Pat. No. 4,984,865 (Lee et al.) describes the use of a hot melt adhesive to hold a fiber in a fiber optic connector. While this has the advantage of being reusable, it requires that the assembly be heated above the softening temperature of the adhesive upon either insertion or removal of a fiber.

A disadvantage of both epoxies and hot melt adhesives is that both require a delay from the time the fiber is installed in order to harden the adhesive. In addition a hot melt adhesive always requires the use of a heating fixture. The heating fixture, in turn, must be powered, sometimes causing inconvenience. An epoxy does not necessarily require the use of a heating fixture, but, for the epoxies typically used in fiber optic connectors, the cure period will be several hours if no heat is applied. Thus epoxies offer a tradeoff between the inconvenience of a long cure period and that of the use of a heating fixture. Alternatively some epoxies require a source of ultraviolet radiation for curing. Such a radiation source still has the requirement that it be powered.

U.S. Pat. No. 4,964,685 (Savitsky et al.) teaches a fiber optic connector in which the fiber is mechanically clamped in the ferrule by a gripping element. In a connector according to the Savitsky et al. patent, however, the gripping element grips the fiber's buffer instead of the fiber itself. Since it is possible for the fiber to move inside of the buffer, it is difficult to precisely align the end of the fiber with the end face of ferrule. This difficulty is increased by the fact that the gripping element is collapsed onto the fiber buffer by moving a nut along the connector in a direction parallel to the fiber. Thus the force and movement required to engage the gripping element are directed parallel to the fiber. This can cause the fiber to move in the ferrule as the gripping element is tightened.

SUMMARY OF THE INVENTION

According to the present invention, an optical fiber connector includes a connector body and a ferrule attached to one another. Each has a bore through it and the bores are aligned. A gripping element resides in the connector body. When the gripping element is in a disengaged state it will receive an optical fiber inserted in the bores. In an engaged state it will hold an optical fiber in the connector body and the ferrule. The gripping element is engageable by moving a plug in a direction transverse to the bores.

DETAIL DESCRIPTION OF A PREFERRED EMBODIMENT

Figure 1:
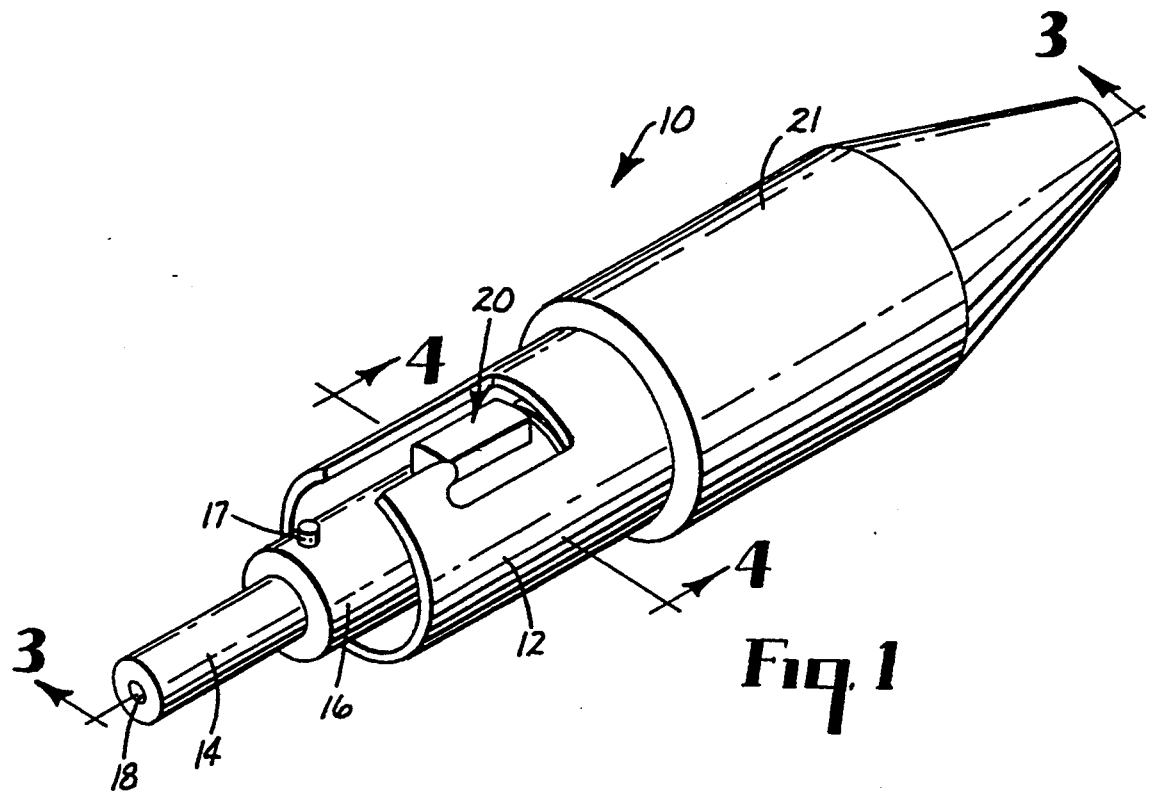
FIG. 1 is a perspective view of a fiber optic connector according to the invention.

FIG. 1 shows an optical fiber connector 10. The optical fiber connector shown in the FIG. 1 includes a housing 16 and a ferrule 14. Housing 16 has a bayonet locking mechanism 12. The apparatus of FIG. 1 is intended to be used in an ST connector. It utilizes the cylindrical ferrule of the ST design. Those skilled in the art will readily perceive, however, that the present invention could be used in any fiber optic connector utilizing a ferrule, whatever the shape of such ferrule. Typically housing 16 would be of a metal such as aluminum while ferrule 14 would be of a ceramic such as zirconia, alumina, or calcium titanate. Alternatively housing 16 could be of a plastic while ferrule 14 could be of a metal or a plastic. Additionally, although it is typical for housing 16 and ferrule 14 to be manufactured separately and attached to one another later, it is possible to mold them as a single unit. For purposes herein, a housing and a ferrule molded as a single, unitary object will still be considered to be a housing and a ferrule attached to one another.

Housing 16 and ferrule 14 are joined together to form connector 10. The combined structure 10 has a major axis with a bore 18 for receiving an optical fiber running along the major axis. Housing 16 further includes an alignment pin 17, for use when connector 10 is coupled to a similar connector to form a fiber optic connection. A plug, 20, is press fit into an opening that intersects bore 18. Housing 16 also includes a strain relief 21. Typically, strain relief 21 is of a pliable material and provides protection for an optical fiber exiting housing 16.

Figure 3:
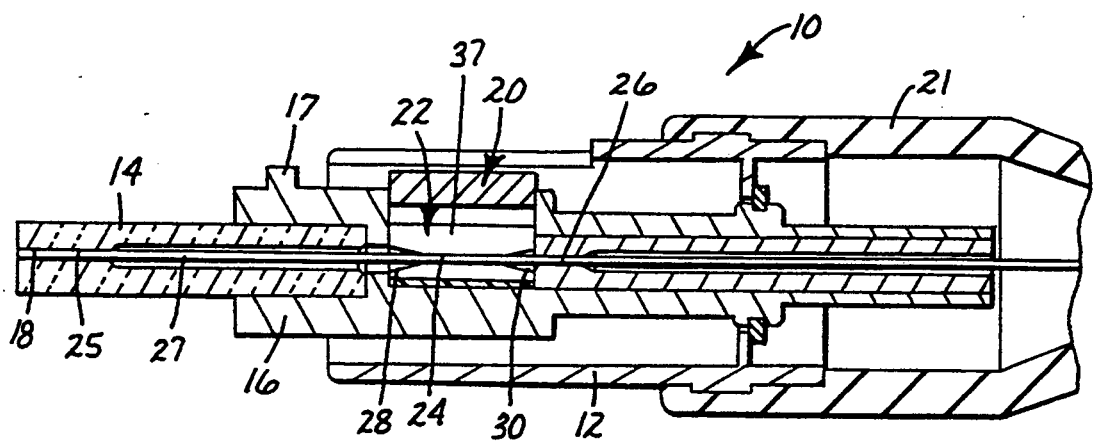
FIG. 3 is a cross-sectional view of a fiber optic connector according to the invention along its axis.

FIG. 3 is a cross-sectional view of the optical fiber connector 10 of FIG. 1. As described previously, a plug 20 is press fit into an opening that intersects with bore 18 as may be seen, bore 18 actually includes two bores aligned with one another. These are bore 25 of ferrule 14 and bore 26 of housing 16. Plug 20 engages with fiber gripping mechanism 22. Fiber gripping mechanism 22 includes a bore 24 in alignment with bore 18. An optical fiber 27 runs through bore 18 and bore 24 where it is tightly gripped. Bore 24 has widened regions 28 and 30 at its ends in order to facilitate inserting optical fiber 27. In the preferred embodiment, fiber gripping element 22 grips optical fiber 27 directly rather than its protective buffer. This is accomplished by having gripping element 22 make direct contact with the optical fiber. This avoids the prior art problem of movement of the fiber within the buffer.

Figure 2:
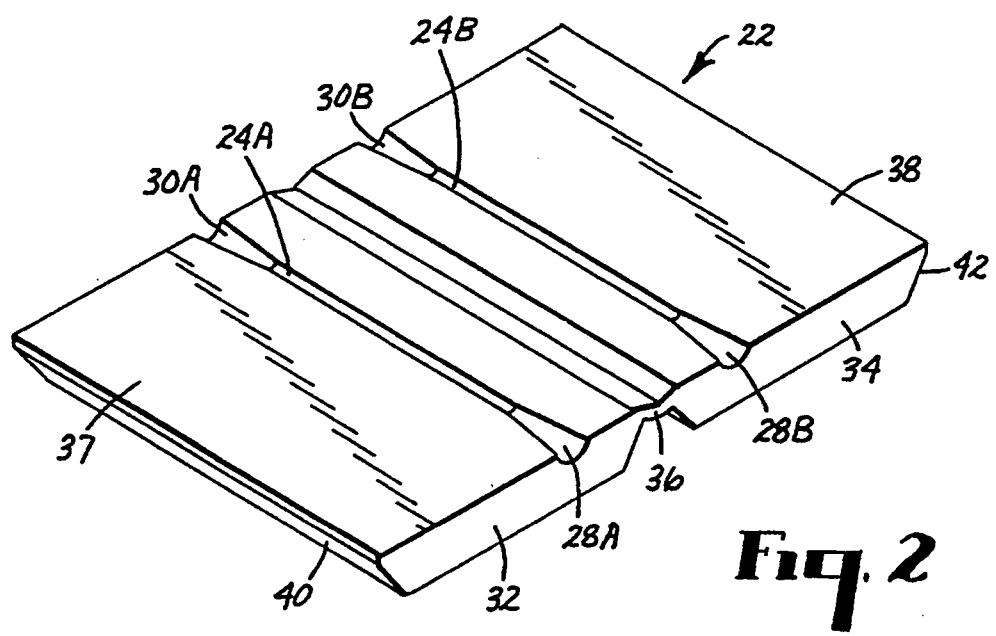
FIG. 2 is a perspective view of a gripping element according to the invention.

FIG. 2 illustrates fiber gripping element 22 in greater detail. In FIG. 2, however, fiber gripping element 22 is shown as it appears prior to being folded for insertion into housing 16. Fiber gripping element 22 has relatively thick side portions 32 and 34 and a relatively thin central portion 36. Thin portion 36 is provided in order to facilitate folding at that location. Fiber gripping element 22 is made of a resilient material such that it may be folded until side regions 32 and 34 lie flat against one another. When sides 32 and 34 are folded together forcing faces 37 and 38 against one another, grooves 24A and 24B come together to form bore 24 with flared regions 28A and 28B and 30A and 30B forming wider regions 28 and 30, respectively. In addition, sides 37 and 38 have beveled edges 40 and 42 respectively. Fiber gripping element 22 may be of any resilient material such as a metal or a plastic is and is preferably of soft aluminum.

Figures 4, 5:
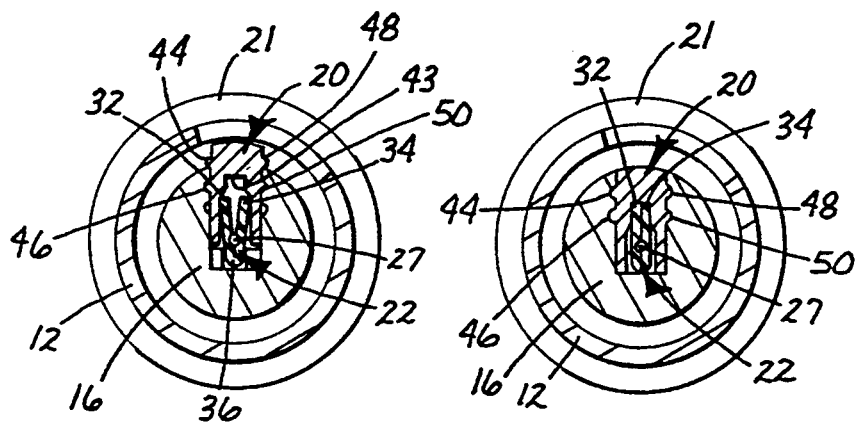
FIG. 4 is a cross-sectional view of a fiber optic connector according to the invention transverse to its axis with the gripping element disengaged.
FIG. 5 is a cross-sectional view of a fiber optic connector according to the invention transverse to its axis with the gripping element engaged.

FIGS. 4 and 5 are cross-sectional views of a fiber optic connector according to the invention along section line 4 of FIG. 1. As shown in FIG. 4, plug 20 has a narrow portion 43 at its top. In FIG. 4 plug 20 is partially removed from the opening in which it is inserted. As a result, fiber gripping element 22 is allowed to spring open widening bore 24 of FIG. 3. With plug 20, and thus fiber gripping element 22, in the position shown in FIG. 4, an optical fiber may easily be inserted or removed from the connector portion.

In FIG. 5, plug 20 has been pressed farther down into its opening. As plug 20 is forced into its opening, it presses on beveled edges 40 and 42 of fiber gripping element 22. This forces side regions 32 and 34 into the narrow top portion 43 of plug 20 between the fingers thereof and thus forces side regions 32 and 34 toward one another until faces 37 and 38 meet. When plug 20 has been inserted far enough into its opening that faces 37 and 38 meet, detentes 44, 46, 48, and 50 will engage notches in housing 16. This provides both tactile feedback indicating engagement to the person installing a fiber into connector 10 as well as helping to hold plug 20 in that location. When plug 20 has been inserted to the location shown in FIG. 5, the installed fiber will be tightly gripped and held in place.

An important feature of the present invention is that plug 20 slides transverse to the fiber in order to tighten fiber gripping element 22. Thus all of the force and movement required to engage fiber gripping element 22 occur in a direction that will not move the fiber relative to the end face of the ferrule. This feature makes it possible to insert a cleaved fiber into a connector until it strikes a plate held against the end face of the connector. The gripping element may then be engaged, leaving the end faces of the fiber and the connector precisely aligned with one another.

Figure 6:
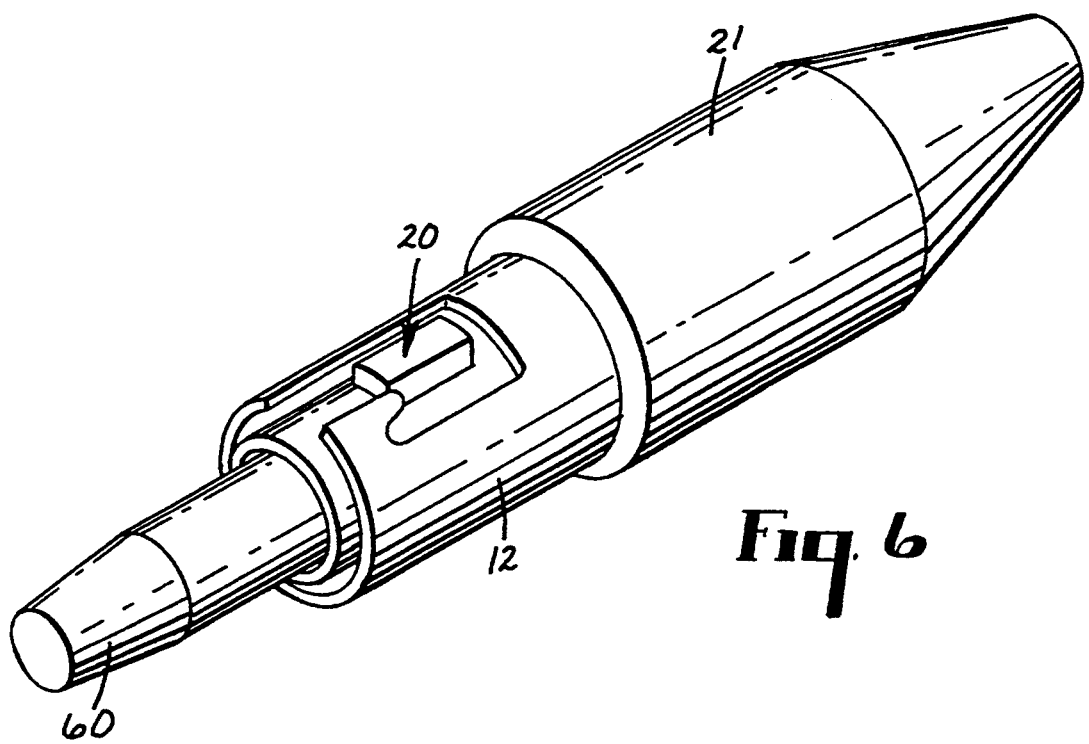
FIG. 6 is a perspective view of a second fiber optic connector according to the invention.

FIG. 6 shows another connector according to the invention. In the connector according to FIG. 6, however, ferrule 60 is in the form of a truncated cone. Thus the connector of FIG. 6 is a biconic connector.

What is claimed is:

1. A fiber optic connector comprising:
    a connector body;
    a ferrule attached to said connector body, each of said connector body and said ferrule having a bore therethrough, said bores being in alignment;
    a plug inserted in said connector body; and
    a gripping means for receiving an optical fiber inserted in said bores with said gripping means in a disengaged state and holding said optical fiber in said bores with said gripping means in an engaged state, said gripping means being engageable by moving said plug in a direction transverse to said bores.

2. A fiber optic connector according to claim 1 wherein said ferrule is a cylinder.

3. A fiber optic connector according to claim 1 wherein said ferrule is a truncated cone.

4. A fiber optic connector according to claim 1 wherein said plug includes first and second fingers for squeezing said gripping means to hold said optical fiber.

5. A fiber optic connector according to claim 4 wherein said gripping means is of soft aluminium.

6. A fiber optic connector according to claim 5 wherein said ferrule is of a ceramic material.

7. A fiber optic connector according to claim 1 wherein said gripping means is of soft aluminium.

8. A fiber optic connector according to claim 7 wherein said ferrule is of a ceramic material.

9. A fiber optic connector according to claim 8 wherein said ferrule is of a material selected from the group consisting of alumina, zirconia, and calcium titanate.

* * * * *